Sept. 11, 1928.
V. D. HUMPHREY
INSECT GUARD FOR FURNITURE
1,684,279
Filed May 7, 1927
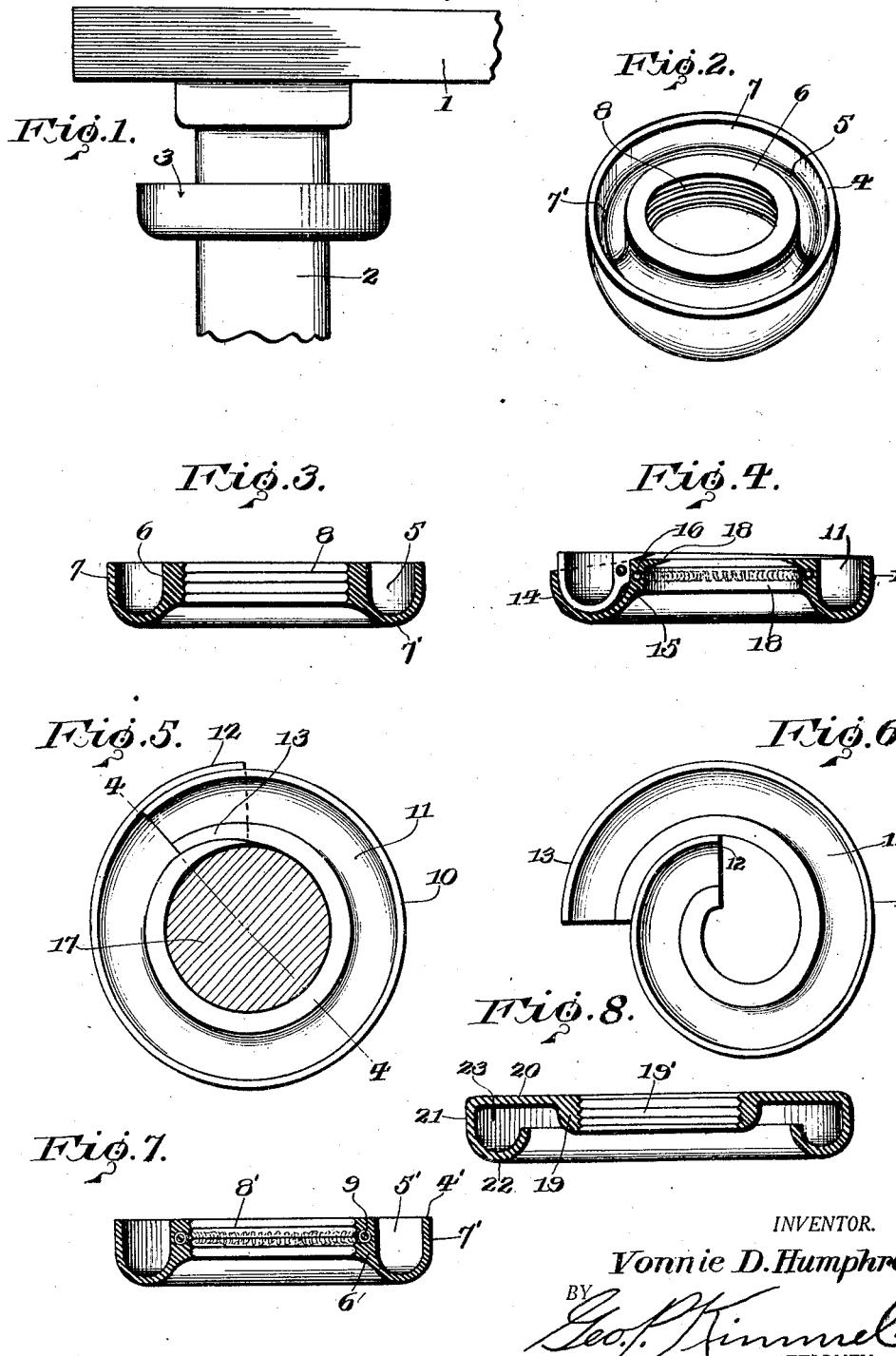
INVENTOR.
Vonnie D. Humphrey
BY Geo. F. Kimmel
ATTORNEY.

Patented Sept. 11, 1928.

1,684,279

UNITED STATES PATENT OFFICE.

VONNIE D. HUMPHREY, OF BISHOPVILLE, SOUTH CAROLINA.

INSECT GUARD FOR FURNITURE.

Application filed May 7, 1927. Serial No. 189,655.

This invention relates to an insect trap or guard for furniture and has for its object to provide, in a manner as hereinafter set forth, means capable of being expeditiously attached to, at any desired point, the legs of an article of furniture for trapping and destroying insects, such as ants, which crawl up the legs of a table, chair or other articles of furniture provided with legs.

A further object of the invention, is to provide, in a manner as hereinafter set forth an insect trap or guard for the purpose referred to, formed of an elastic unit for tightly gripping the table leg in a manner to prevent the passage of the insects between the unit and the leg, and further in a manner whereby the unit will be retained in set position, and further with the clamping action between the unit and the leg being such to prevent the shifting of the unit from set position when the article of furniture is bodily moved, accidentally tilted or shifted.

Further objects of the invention are to provide, in a manner as hereinafter set forth, an insect trap or guard for the purpose referred to, which is simple in its construction and arrangement, durable, compact, resilient, expeditiously placed in trapping position with respect to the leg of an article of furniture, thoroughly efficient in its use, and comparatively inexpensive to manufacture.

With the foregoing and other objects in view the invention consists of the novel construction, combination and arrangement of parts as hereinafter more specifically described and illustrated in the accompanying drawings, wherein is shown an embodiment of the invention, but is is to be understood that changes, variations and modifications can be resorted to which fall within the scope of the claims hereunto appended.

In the drawings wherein like reference characters denote corresponding parts throughout the several views:

Figure 1 is a fragmentary view, in elevation, of an article of furniture showing the adaptation with the leg thereof of an insect trap or guard in accordance with this invention.

Figure 2 is a perspective view of the insect trap or guard.

Figure 3 is a cross sectional view.

Figure 4 is a section on line 4—4 Figure 5 of the modified form shown in Figures 5 and 6.

Figure 5 is a top plan view of a modified form.

Figure 6 is a top plan view of the modification shown in Figure 5.

Figure 7 is a cross sectional view of another modified form.

Figure 8 is a cross sectional view of still another modified form.

Referring to the drawings in detail 1 denotes a table top and 2 one of the supporting legs therefor. The foregoing elements are illustrated to show the adaptation of an insect trap or guard with respect to the leg 2. It is to be understood that the insect trap or guard can be used in connection with any article of furniture for which it is found applicable. The insect trap or guard which is mounted on the leg 2 is referred to generally by the reference character 3 and it can be positioned at any desirable point on the leg 2 and possesses the characteristic to tightly clamp or bind against the leg 2 whereby the trap or guard will be removably secured in set position.

Referring to Figures 1, 2 and 3 of the drawings the trap or guard comprises a resilient body portion 4 preferably constructed of rubber, but it is to be understood that it can be set up of any suitable material and said body portion 4 is in the form of an annulus. The body portion 4 is formed to provide an annular trough 5 which is of U-shaped contour in cross section. The inner wall 6 of the trough 5 is of greater thickness, in cross section, than the outer wall 6' thereof. The bottom of the body portion 4 is rounded as indicated at 7. The inner face of the body portion 4 is provided with a series of spaced, annular, feathered edge ridges 8 to provide a snug fit with the leg 2 to prevent the passage of the insects between the periphery of the leg 2 and the inner face of the body portion 4.

With reference to Figures 4, 5 and 6 the trap or guard is formed from a length of resilient material having embedded therein a coiled spring and with the ends of the length interengaging with each other. The material from which the guard or trap can be set up can be of any desired length and in the form of a roll and the material can be cut into suitable lengths, as shown in Figures 4, 5 and 6, or as desired and folded in the manner as shown in Figure 5 to provide the trap or guard. In Figures 4, 5, and 6 the body portion of the trap or guard is indicated at 10, the trough formed thereby at 11, the end terminal portions of the body portion 10 which interengage with each other indicated at 12, 13. The outer wall of the trough 11 is designated 14 and the inner wall at 15 and the latter is of greater thickness than the outer wall 14. The coiled spring which is embedded in the inner wall 15 is designated 16. After a length of the material has been cut, such length being shown in Figure 6, the ends of the length are then positioned in the manner as shown in Figure 5 to conform to the shape of the leg 17 upon which the trap or guard is mounted. Any suitable means can be employed for securing the end terminal portions 12, 13 together. The inner face of the body portion 10 at its top is formed with a ridge 18 having feather edges to snugly grip the leg 17.

The modified form shown in Figure 7 is the same as that shown in Figures 1 to 3, with this exception that the wall 6 of the trough 5 has embedded therein a circular coiled spring 9 which assists in setting up a clamping action between the trap or guard and the leg 2. In Figure 7 the body portion is indicated at 4', the trough at 5', the inner wall of the trough at 6, and the outer wall at 7'.

The inner face of the body portion 4' of the form shown in Figure 7 is provided with spaced annular ridges 8' having feathered edges for the purpose of tightly gripping the leg 2.

Referring to the form shown in Figure 8 it comprises an annular body portion 19 having a ribbed inner face 19'. Extended from the top of the body portion 19 is a flange 20 terminating in a depending extension 21 which merges into a curved inwardly extending arm 22 which provides a trough 23. The flange 20, extension 21 and arm 22 are annular. The arm 22 is spaced from and depends below the body portion 19.

Owing to the resiliency of the body portion of the trap or guard it can be made to conform to legs of different contours and will tightly clamp the same, due to the resilient characteristic of the body portion.

The trough formed in each of the body portions is adapted to have arranged therein a suitable insect powder for killing the insects. This powder or substance is not illustrated. The trough formed in the body portion can also contain a liquid solution for the purpose of killing the insects. The powder or solution would be such as to attract the insects.

The body of the trap or guard can be constructed of any suitable material, and the guard provides means for trapping the insects so that the insects will not travel to the table top or to the upper ends of the legs of the article of furniture, and therefore it is thought that the many advantages of an insect trap or guard for the purpose referred to, can be readily understood, and although the preferred embodiment of the invention is as illustrated and described, yet it is to be understood that changes in the details of construction can be had which will fall within the scope of the invention as claimed.

What I claim is:

1. An insect guard for the purpose set forth comprising an automatically adjustable body portion in the form of an annulus possessing a clamping characteristic for connection to the leg of an article of furniture, said body formed with an annular trough opening at the top thereof, and said body formed on its inner face with spaced annular ribs.

2. An insect guard for the purpose set forth comprising an automatically adjustable body portion in the form of an annulus possessing a clamping characteristic for connection to the leg of an article of furniture, said body portion formed with an endless trough opening at the top thereof, the outer wall of said trough being of less thickness than the inner wall thereof, and said body portion further having its inner face provided with spaced annular ribs.

3. An insect guard for the purpose set forth comprising an automatically adjustable body portion in the form of an annulus possessing a clamping characteristic for connection to the leg of an article of furniture, said body portion formed with an endless trough opening at the top thereof, the outer wall of said trough being of less thickness than the inner wall thereof, said body portion further having its inner face provided with spaced annular ribs, said ribs having pointed edges.

4. An insect guard for the purpose set forth comprising an automatically adjustable body portion in the form of an annulus possessing a clamping characteristic for connection to the leg of an article of furniture, said body formed with an annular trough opening at the top thereof, and said body portion having a ribbed inner face.

5. An insect guard for the purpose set forth comprising an automatically adjustable body portion possessing a clamping characteristic for fixedly securing it in position, said body portion provided with a trough and further formed with a ribbed inner face.

6. An insect guard for the purpose set forth comprising an automatically adjustable body portion in the form of an annulus possessing a clamping characteristic for connection to the leg of an article of furniture, said body portion formed with an endless trough, the inner wall of said trough being of greater thickness than the outer wall thereof, and said body portion having its inner face ribbed.

7. An insect guard for the purpose set forth comprising a body portion formed with an endless trough, said body portion in the form of an annulus having a ribbed face.

8. An insect guard for the purpose set forth comprising a body portion possessing a clamping characteristic for connection to the leg of an article of furniture said body portion formed with an endless trough, that part of said body portion, connected to such leg being of greater thickness than the outer part of said body portion, and that part of said body portion for connection with such leg having the clamping face thereof ribbed.

In testimony whereof, I affix my signature hereto.

VONNIE D. HUMPHREY.